(12) United States Patent
Nakase et al.

(10) Patent No.: US 6,230,064 B1
(45) Date of Patent: May 8, 2001

(54) APPARATUS AND A METHOD FOR ANALYZING TIME SERIES DATA FOR A PLURALITY OF ITEMS

(75) Inventors: Akihiko Nakase, Tokyo; Mitsuru Kakimoto; Shigeru Oyanagi, both of Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/106,091

(22) Filed: Jun. 29, 1998

(30) Foreign Application Priority Data

Jun. 30, 1997 (JP) .................................................... 9-174503

(51) Int. Cl.[7] ................................................ G06F 155/00
(52) U.S. Cl. ............................................ 700/90; 345/339
(58) Field of Search ............... 700/90–93; 345/339–380, 345/357; 705/8; 707/1–3

(56) References Cited

U.S. PATENT DOCUMENTS

| | | | |
|---|---|---|---|
| 5,581,276 | * 12/1996 | Cipolla et al. ........................ | 345/156 |
| 5,748,907 | * 5/1998 | Crane ...................................... | 705/2 |
| 5,819,261 | * 10/1998 | Takahashi et al. ....................... | 707/3 |
| 5,874,965 | * 2/1999 | Takai ..................................... | 345/357 |
| 5,933,821 | * 8/1999 | Matsumoto et al. ..................... | 707/1 |
| 6,020,898 | * 2/2000 | Saito et al. ........................... | 345/440 |
| 6,034,683 | * 3/2000 | Mansour et al. ...................... | 345/339 |
| 6,073,110 | * 6/2000 | Rhodes et al. ........................... | 705/8 |

OTHER PUBLICATIONS

Rakesh Agrawal, et al., "Mining Sequential Patterns," Proc. of the International Conference on Data Engineering, (1995).

* cited by examiner

*Primary Examiner*—Thomas Lee
*Assistant Examiner*—Rijue Mai
(74) *Attorney, Agent, or Firm*—Oblon, Spivak, McClelland, Maier & Neustadt, P.C.

(57) ABSTRACT

An association rule extraction apparatus extracts an association rule from time series data including events. A characteristic part extraction section extracts a characteristic change part from time series data of each event as an event sequence. The event sequence includes at least a start time of the characteristic change part as attribute data. An association rule extraction section extracts the association rule representing a tendency among the events in accordance with the attribute data.

25 Claims, 16 Drawing Sheets

*FIG. 10a*

SHOP A

| PRODUCT NAME | APRIL | MAY | JUNE | JULY | AUGUST | SEPTEMBER | OCTOBER |
|---|---|---|---|---|---|---|---|
| X | 5 | 10 | 17 | 16 | 17 | 13 | 15 |
| Y | 10 | 12 | 9 | 15 | 22 | 20 | 21 |

*FIG. 10b*

SHOP B

| PRODUCT NAME | APRIL | MAY | JUNE | JULY | AUGUST | SEPTEMBER | OCTOBER |
|---|---|---|---|---|---|---|---|
| X | 4 | 3 | 8 | 18 | 18 | 16 | 17 |
| Y | 1 | 0 | 2 | 1 | 9 | 17 | 16 |

*FIG. 10c*

SHOP C

| PRODUCT NAME | APRIL | MAY | JUNE | JULY | AUGUST | SEPTEMBER | OCTOBER |
|---|---|---|---|---|---|---|---|
| X | 10 | 15 | 21 | 20 | 21 | 22 | 20 |
| Y | 10 | 11 | 10 | 17 | 25 | 23 | 21 |

FIG. 11a

SHOP A

| PRODUCT NAME | CHARACTERISTIC TIME SERIES PART |
|---|---|
| X | SUDDEN INCREASE (FROM APRIL, FOR TWO MONTHS) |
| Y | SUDDEN INCREASE (FROM JUNE, FOR TWO MONTHS) |

FIG. 11b

SHOP B

| PRODUCT NAME | CHARACTERISTIC TIME SERIES PART |
|---|---|
| X | SUDDEN INCREASE (FROM MAY, FOR TWO MONTHS) |
| Y | SUDDEN INCREASE (FROM JULY, FOR TWO MONTHS) |

FIG. 11c

SHOP C

| PRODUCT NAME | CHARACTERISTIC TIME SERIES PART |
|---|---|
| X | SUDDEN INCREASE (FROM APRIL, FOR TWO MONTHS) |
| Y | SUDDEN INCREASE (FROM JUNE, FOR TWO MONTHS) |

FIG. 12

| SHOP NAME | EVENT SEQUENCE |
|---|---|
| A | [X-SUDDEN INCREASE, FROM APRIL, FOR TWO MONTHS] [Y-SUDDEN INCREASE, FROM JUNE, FOR TWO MONTHS] |
| B | [X-SUDDEN INCREASE, FROM MAY, FOR TWO MONTHS] [Y-SUDDEN INCREASE, FROM JULY, FOR TWO MONTHS] |
| C | [X-SUDDEN INCREASE, FROM APRIL, FOR TWO MONTHS] [Y-SUDDEN INCREASE, FROM JUNE, FOR TWO MONTHS] |

FIG. 13

| SHOP NAME | EVENT PAIR |
|---|---|
| A | ([X-SUDDEN INCREASE, FROM APRIL, FOR TWO MONTHS] [Y-SUDDEN INCREASE, FROM JUNE, FOR TWO MONTHS]) |
| B | ([X-SUDDEN INCREASE, FROM MAY, FOR TWO MONTHS] [Y-SUDDEN INCREASE, FROM JULY, FOR TWO MONTHS]) |
| C | ([X-SUDDEN INCREASE, FROM APRIL, FOR TWO MONTHS] [Y-SUDDEN INCREASE, FROM JUNE, FOR TWO MONTHS]) |

FIG. 14

| SHOP NAME | EVENT PAIR |
|---|---|
| A | ([X-SUDDEN INCREASE, FROM N+h MONTH, FOR TWO MONTHS] [Y-SUDDEN INCREASE, FROM (N+2)th MONTH, FOR TWO MONTHS]) |
| B | ([X-SUDDEN INCREASE, FROM N+h MONTH, FOR TWO MONTHS] [Y-SUDDEN INCREASE, FROM (N+2)th MONTH, FOR TWO MONTHS]) |
| C | ([X-SUDDEN INCREASE, FROM N+h MONTH, FOR TWO MONTHS] [Y-SUDDEN INCREASE, FROM (N+2)th MONTH, FOR TWO MONTHS]) |

FIG. 15

| SHOP NAME | EVENT SEQUENCE |
|---|---|
| A | SPECIAL SALE ADVERTISEMENT (JAN.10), GENERAL CLEANING (JAN.11), FULL-HOUSE BONUS (JAN.12) |
| B | STOCKTAKING (JAN.21), SPECIAL SALE ADVERTISEMENT (JAN.23), FULL-HOUSE BONUS (JAN.25) |

FIG. 16

| SHOP NAME | EVENT PAIR |
|---|---|
| A | (SPECIAL SALE ADVERTISEMENT (JAN.10), FULL-HOUSE BONUS (JAN.12)) |
| B | (SPECIAL SALE ADVERTISEMENT (JAN.23), FULL-HOUSE BONUS (JAN.25)) |

FIG. 17

| SHOP NAME | EVENT PAIR |
|---|---|
| A | (SPECIAL SALE ADVERTISEMENT (JAN.10), GENERAL CLEANING (JAN.11)) |
| B | |

FIG. 18

| SHOP NAME | EVENT PAIR |
|---|---|
| A | (GENERAL CLEANING (JAN.11), FULL-HOUSE BONUS (JAN.12)) |
| B | |

FIG. 19

| SHOP NAME | EVENT PAIR |
|---|---|
| A | |
| B | (STOCKTAKING (JAN.21), SPECIAL SALE ADVERTISEMENT (JAN.23)) |

FIG. 20

| SHOP NAME | EVENT PAIR |
|---|---|
| A | |
| B | (STOCKTAKING (JAN.21), FULL-HOUSE BONUS (JAN.25)) |

FIG. 21

| SHOP NAME | EVENT PAIR |
|---|---|
| A | (SPECIAL SALE ADVERTISEMENT (DATE: N), FULL-HOUSE BONUS (DATE: N+2)) |
| B | (SPECIAL SALE ADVERTISEMENT (DATE: N), FULL-HOUSE BONUS (DATE: N+2)) |

APPARATUS AND A METHOD FOR ANALYZING TIME SERIES DATA FOR A PLURALITY OF ITEMS

FIELD OF THE INVENTION

The present invention relates to an association rule extraction apparatus and a method to extract an association rule from of time series data to determine events related to sales tendencies based on the time series data of sales results.

BACKGROUND OF THE INVENTION

Recently, because of the large capacity and lower prices of memory devices, large quantities of data are stored in a database. In such a database, the data, organized by units of predetermined periods such as times, day, week, or month, are stored for relative long time. In this case, information such as a sales result is stored in this data base. By analysing the information, a tendency related with sales (consumer's purchase) is extracted for a marketing or sales strategy.

FIG. 10 shows one example of sales data of a product gathered by a retail store. FIGS. 10A, 10B, 10C respectively show sales trends of product X and product Y from April to October in shops A, B, C. The data in FIG. 10 is plotted as a graph and easily analyzed by sight. In this case, the following three aspects are obtained as analysis result.

(1) In shop A, sales of product X grow from April to June and sales of product Y grow from June to August.

(2) In shop B, sales of product X grow from May to July and sales of product Y grow from July to September.

(3) In shop C, sales of product X grow from April to June and sales of product Y grow from June to August.

As a proposition estimated from above analysis, a rule such as "If sales of product X grow, sales of product Y also grow after two months" is considered.

In this way, an extraction of the rule including the time series is very important for early detection of a change sign on trade activity of the shop. In order to obtain the rule, the sales of each product are represented as a graph. A specialist decides the association rule between the time series data by watching the graph. However, if a large number of products are treated in each shop, the sales data for a long period is analysed, and the number of shops becomes large, the specialist can not easily analyse the sales data by himself.

As a method to analyse a similarity of shape of a time difference between the time series, a combination of two time series data is created. In this case, whenever one time series data is shifted along a direction of time axis, statistical analysis such as regression analysis is executed to find the association rule between the two time series data. However, the calculation burden increases in proportion to the product of the number of combinations of series number and the time length of the two time series data. Accordingly, this method is not suitable for the time series analysis including a large series number and a long period.

Furthermore, in case of analysing the sales data, the analysis result is often extracted due to not association between two time series data but to association between one time series data and a predetermined time. For example, if sales of cake rapidly grow toward December 24th and sales of rice cake rapidly grow after December 25th for all shops, a rule such as "If sales of cake grow, sales of rice cake also grow after one week" is mistakenly extracted. In this way, as for sales object related with predetermined time, a rule representing dependency between the predetermined time and the time series data is desirably extracted as "The cake sells well toward Christmas and the rice cake sells well toward New Year's day."

As mentioned-above, when extracting the association rule from large scale time series data, the specialist can not easily analyse the time series data by sight alone. Furthermore, in case of the statistical analysis, the processing time increases in proportion to a product of a number of combination of series number and a quantity of the time series data. Therefore, the statistical analysis is not suitable for the time series analysis including a large series number and a long period.

SUMMARY OF THE INVENTION

It is one object of the present invention to provide an association rule extraction apparatus and a method to greatly reduce a quantity of time series data to be analysed as the event.

It is another object of the present invention to provide an association rule extraction apparatus and a method to easily extract an association rule from the time series data including the events.

According to the present invention, there is provided an association rule extraction apparatus to extract an association rule from time series data including events, comprising: characteristic part extraction means for extracting a characteristic change part from the time series data of each event as an event sequence, the event sequence including at least a start time of the characteristic change part as attribute data; and association rule extraction means for extracting the association rule representing a tendency among the events in accordance with the attribute data.

Further in accordance with the present invention, there is also provided a method for extracting an association rule from time series data including events, comprising the steps of: extracting a characteristic change part from the time series data of the each event an event sequence, the event swquence including at least a start time of the characteristic change part as attribute data; and extracting the association rule representing a tendency among the events in accordance with the attribute data.

Further in accordance with the present invention, there is also provided a computer readable memory containing computer readable instructions to extract an association rule from time series data including events, comprising: instruction means for causing a computer to extract a characteristic change part from the time series data of each event as an event sequence, the event sequence including at least a start time of the characteristic change part as attribute data; and instruction means for causing a computer to extract the association rule representing a tendency among the events in accordance with the attribute data.

Further in accordance with the present invention, there is also provided an apparatus to extract a characteristic time series part from time series data comprising: time series data memory means for storing the time series data including events; and characteristic part extraction means for extracting a characteristic change part from the time series data of each event as an event sequence, the event sequence including at least a start time of the characteristic change part as attribute data.

Further in accordance with the present invention, there is also provided an apparatus to extract an association rule from time series data including events, comprising: event memory means for storing a characteristic change part of time series data of each event as an event sequence, the event sequence including at least a start time of the characteristic change part as attribute data; and association rule extraction means for extracting the association rule representing a tendency among the events in accordance with the attribute data.

Further in accordance with the present invention, there is also provided a method for extracting a characteristic time series part from time series data, comprising the steps of: storing the time series data including events; and extracting a characteristic change part from time series data of each event as an event sequence, the event sequence including at least a start time of the characteristic change part as attribute data.

Further in accordance with the present invention, there is also provided a method for extracting an association rule from time series data including events, comprising the steps of: storing a characteristic change part of time series data of each event as an event sequence, the event sequence including at least a start time of the characteristic change part as attribute data; and extracting the association rule representing a tendency among the events in accordance with the attribute data.

Further in accordance with the present invention, there is also provided a computer readable memory containing computer readable instructions to extract a characteristic time series part from time series data, comprising: instruction means for causing a computer to store the time series data including events; and instruction means for causing a computer to extract a characteristic change part from time series data of each event as an event sequence, the event sequence including at least a start time of the characteristic change part as attribute data.

Further in accordance with the present invention, there is also provided a computer readable memory containing computer readable instructions to extract an association rule from time series data including events, comprising: instruction means for causing a computer to store a characteristic change part of time series data of each event as an event sequence, the event sequence including at least a start time of the characteristic change part as attribute data; and instruction means for causing a computer to extract the association rule representing a tendency among the events in accordance with the attribute data.

BRIEF DESCRIPTION OF THE DRAWINGS

FIGS. 10($a$), 10($b$), and 10($c$) show examples of the time series data to be analysed.

FIGS. 11($a$), and 11($c$) show examples of the characteristic time series part extracted from the time series data.

FIG. 12 is an example of the event sequence extracted from the characteristic time series part.

FIG. 13 is an example of the event pair generated from the event sequence.

FIG. 14 is an example of the event pair whose start time is normalized.

FIG. 15 is an example of other event sequence.

FIG. 16 is an example of first event pair generated from the other event sequence.

FIG. 17 is an example of second event pair generated from the other event sequence.

FIG. 18 is an example of third event pair generated from the other event sequence.

FIG. 19 is an example of fourth event pair generated from the other event sequence.

FIG. 20 is an example of fifth event pair generated from the other event sequence.

FIG. 21 is an example of the first event pair whose start time is normalized.

DETAILED DESCRIPTION OF THE PREFERRED EMBODIMENTS

Figure 1:
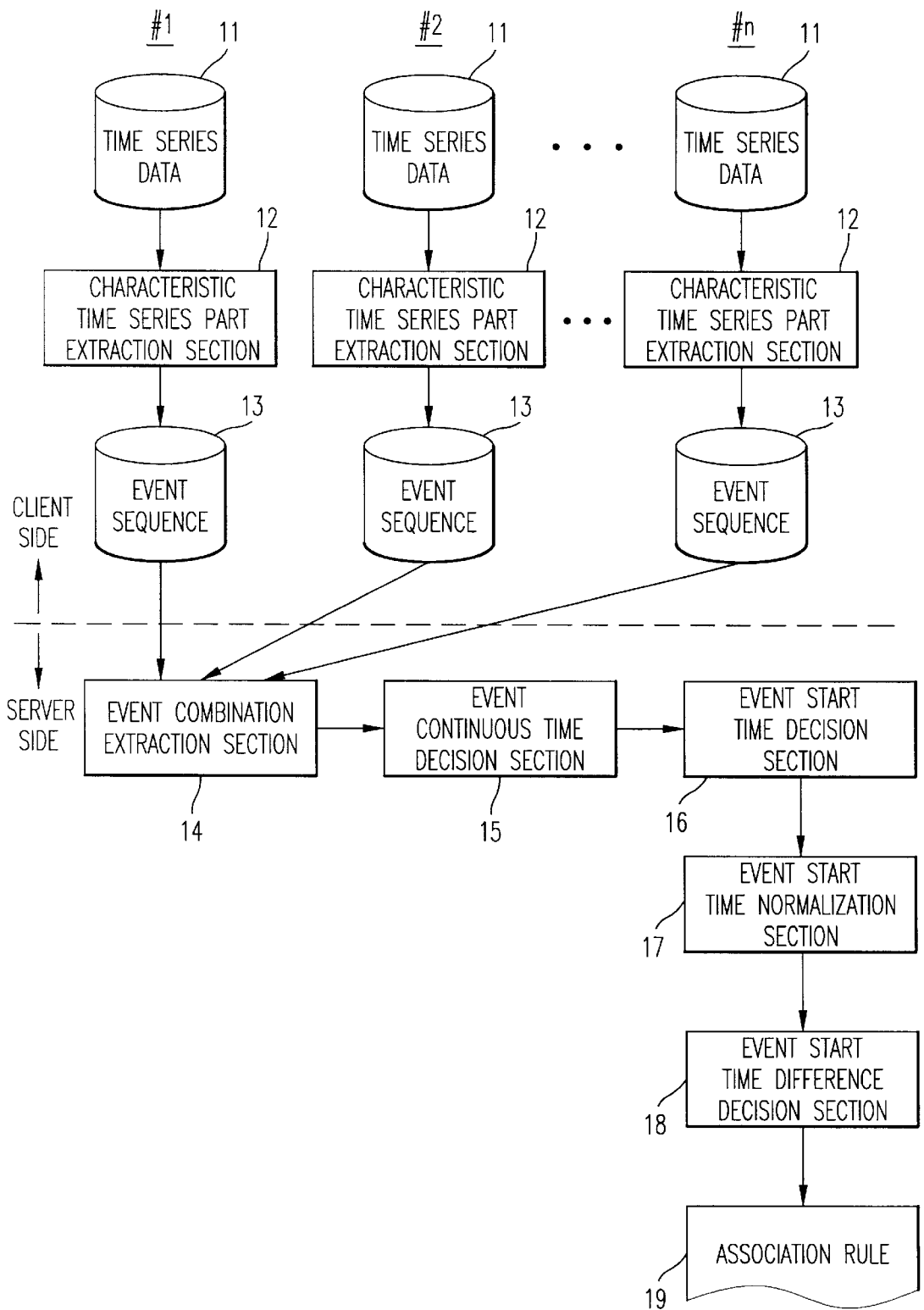
FIG. 1 is a block diagram of data processing system according to the present invention.

Embodiments of the present invention will be explained referring to FIGS. FIG. 1 is a block diagram of the data processing system according to the first embodiment of the present invention. The data processing system includes a plurality of client apparatus (shop system) and one server apparatus (center system). As one example, assume that the client apparatus is respectively set to a plurality of shops, the server apparatus is set to one center system, and a tendency of product sale and purchase is analysed by the time series data gathered from each shop to the center system. In this case, the client apparatus is called "the shop system" and the server apparatus is called "the center system".

As shown in FIG. 1, each client apparatus (#1~#n) includes a time series data base 11, a characteristic time series part extraction section 12, and an event sequence memory section 13. The server apparatus includes an event combination extraction section 14, an event continuous time decision section 15, an event start time decision section 16, an event start time normalization section 17, and an event start time difference decision section 18. Data transmission between the each client apparatus and the server apparatus is executed through a communication network by communication apparatus (not shown in FIG. 1) respectively set to the each client apparatus and the server apparatus. The client apparatus and the server apparatus consists of a computer, a program corresponding to each component, and a necessary operating system and so on. The shop system may be realized by adding the above-mentioned function to POS system of shop side.

In "start time" used in the following explanation, "time" represents a time period (one day is divided into a plurality of periods), a day, a week, or a month according to division of time axis of time series data. On the other hand, "time" in "continuous time" represents number of time period, number of day, number of week, number of month according to division of time axis of time series data.

First, each component of the client apparatus is explained. The time series database 11 stores a plurality of time series data as a relational database. The time series data in this embodiment consist of time-serially arranging value of variable for one item (event object). In this example of an estimation of purchase tendency, the time series database 11 is preferably created by POS data. By unit of predetermined period or classification of product sold in the shop, a quantity of sold product is sumed up. As the classification of product used for sum unit of sale quantity, product name (the event object) is basically desiable. Otherwise, a category including a plurality of product name may be used for the sum unit. The predetermined period is, for example, the time period unit, the day unit, the week unit, the month unit. As a sum period of sale quantity, one kind of above-mentioned units may be used or the time series data sumed each sale quantity for several kinds of above-mentioned units may be used. A content of the time series database 11 may be inputted from outside or may be created in the client apparatus based on input data from outside. In this example of estimation of purchase tendency, if the client apparatus (shop system) is realized by adding necessary function to POS system, the time series database 11 is easily created by POS data stored in the POS system.

If plural kinds of time series data (for example, day unit and month unit) are stored in the time series database, the following processing in the client apparatus is separately executed by unit of time series data whose division along the time axis is the same.

Figure 2:
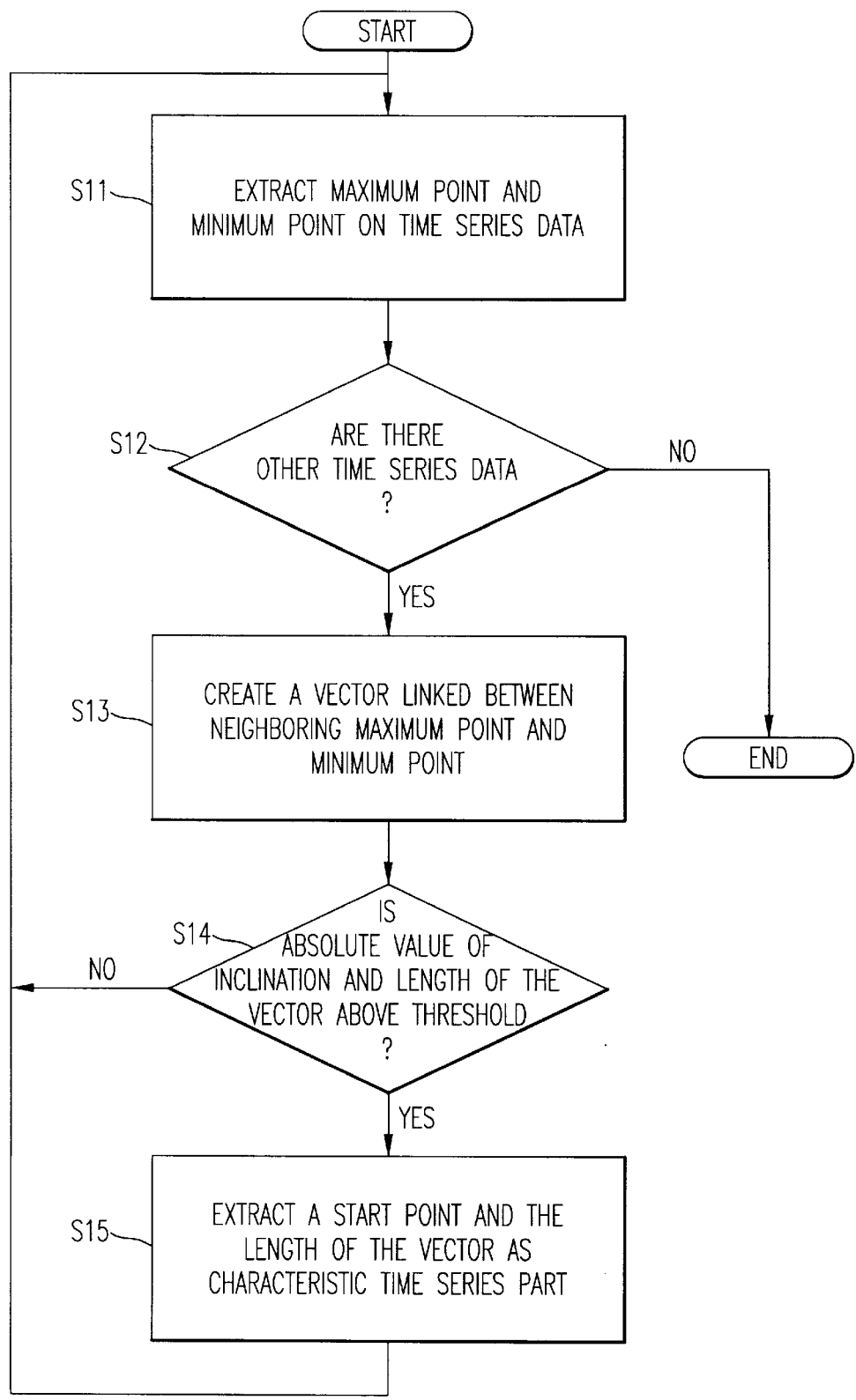
FIG. 2 is a flow chart of processing of a characteristic time series part extraction section of the present invention.
Figure 3:
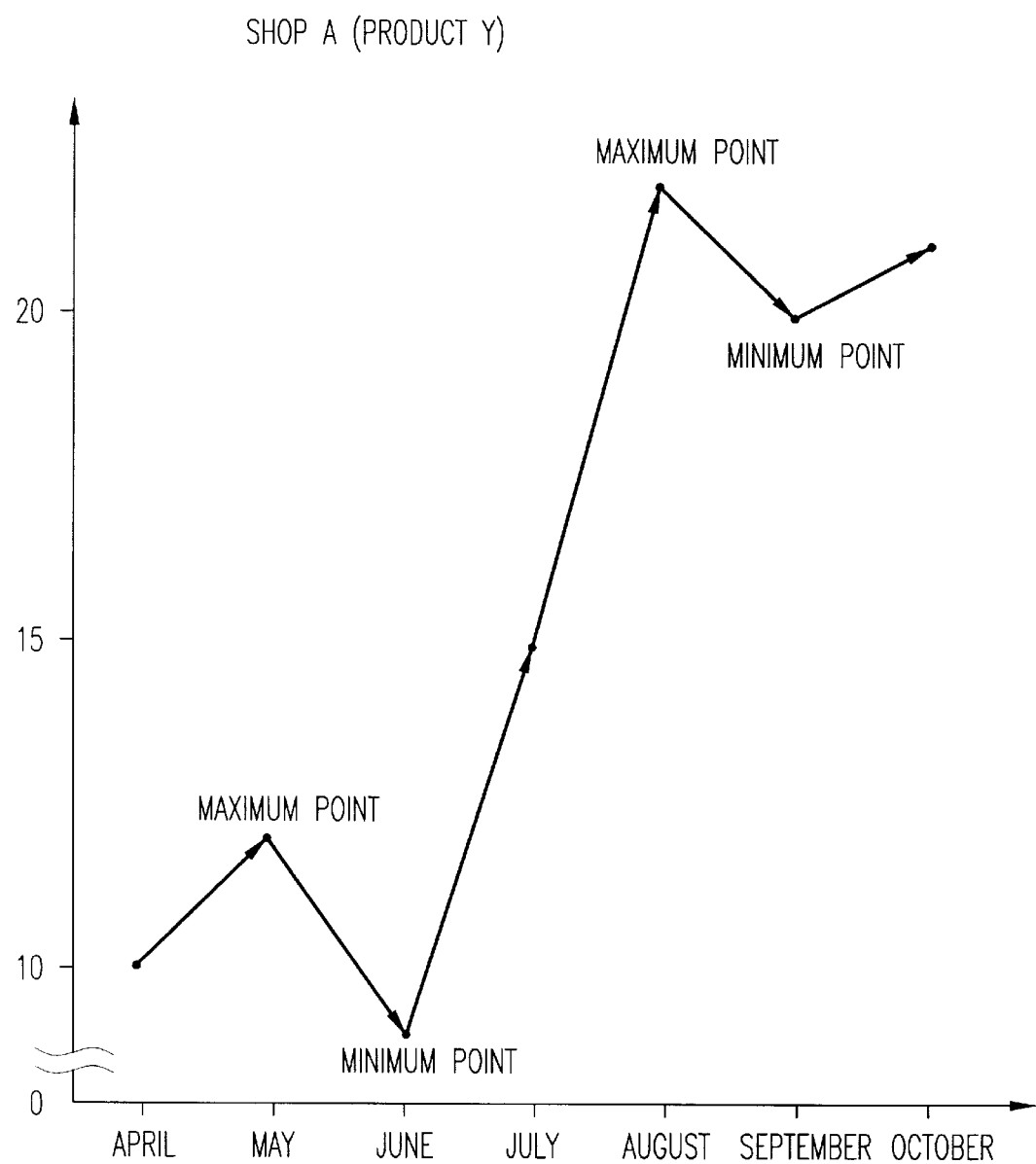
FIG. 3 is an example of a graph representing monthly sale of a product.

The characteristic time series part extraction section 12 extracts a characteristic time series part from the time series database 11 and converts the characteristic time series part to event sequence (event data). In this case, classification, start time and continuous time of the characteristic time series part is respectively event object, event start time and event continuous time of the event sequence. FIG. 2 is a flow chart of processing of the characteristic time series part extraction section 12. This processing is executed for each time series data in the time series database 11. The following processing is repeated untill unprocessed time series data do not remain in the time series database 11. First, one time series data extracted from the time series database 11 is represented as a broken line graph in which the horizontal axis is time (day, week, month) and the vertical axis is variable. FIG. 3 is an example of a broken line graph representing sale quantity of product Y of shop A in FIG. 10A. As shown in FIG. 3, a maximum point and a minimum point are extracted from the broken line graph (S11 in FIG. 2) and vector linked between the maximum point and neighboring minimum point (S13 in FIG. 2). A direction of the vector is set as positive along time axis direction. A length of the vector is a length of element along time axis direction. An inclination of the vector is set as 0 degree (or radian) along the time axis direction and set as positive in case the element of the vector along variable (sale quantity) direction is positive (the sale quantity increases). Next, an absolute value of the inclination of the vector is decided to be above a first threshold and the length of the vector is decided to be above a second threshold (S14 in FIG. 2). If at least one of above two conditions is not satisfied, processing is returned to S11 in FIG. 2. In this case, the next time series date is extracted and processed at S12 in FIG. 2. If both of the two conditions are satisfied, a start point, a length and the inclination of the vector are extracted as the characteristic time series part to express the event sequence (S15 in FIG. 2). In this case, the start point is a start time of the event sequence and the length is a continuous time of the event sequence. The inclination of the vector (positive and negative, degree of inclination) is a characteristic sign of an event name. The event name is represented by combining the characteristic sign with the event object (product name) of the time series data. In the sale result of shop as the time series data, if the above-mentioned vector is extracted because the sale of product X suddenly increases (the inclination of the vector is positive and above the threshold), "[X_SUDDEN INCREASE]" is generated as the event name. Then, one event sequence is obtained by combining the event name, the event start time and the event continuous time. For example, "[X_SUDDEN INCREASE, FROM APRIL, FOR TWO MONTH]" is obtained as one event sequence. (If this event sequence is abstractly signed, [A,4, 2] is obtained).

The event sequence obtained by the characteristic time series part extraction section 12 is stored in the event sequence memory section 13. In this way, post processing is more efficient because the time series numeric data is reduced as the event sequence by the caracteristic time series part extraction section 12. Processing of FIG. 2 is executed by unit of one vector. However, each processing of S11, S13,S14,S15 may be executed as batch process.

Figure 4:
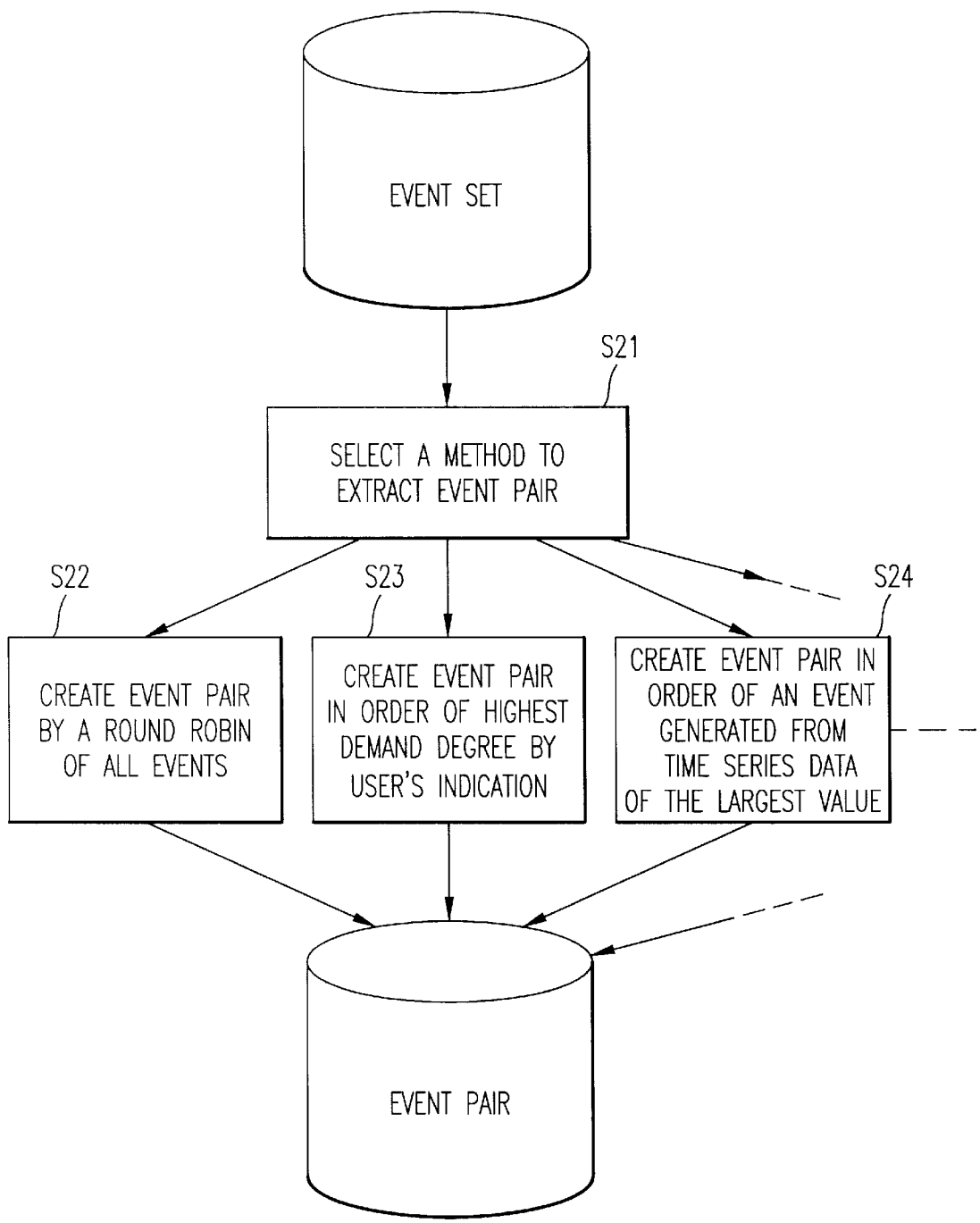
FIG. 4 is a flow chart of processing of an event combination extraction section of the present invention.

Next, each component of the server apparatus is explained. First, the event combination extraction section 14 is explained. The event combination extraction section 14 extracts an event pair (two events combination) when the event sequences are supplied by each client apparatus. In case of concrete example of estimation of purchase tendency, the event combination extraction section 14 extracts the event pair generated commonly in a plurality of shops by using the event sequences gathered from each shop. FIG. 4 is a flow chart of processing of the event combination extraction section 14. The event combination extraction section 14 creates a first event pair by a predetermined method indicated by the user or set as a default (S22,S23,S24). If the first event pair is included in all (or more than predetermined number of) event sequences respectively obtained from a plurality of the time series databases (for example, the event sequence of each shop), the event name, the event start time, and the event continuous time of the first event pair are extracted from each event sequence including the first event pair. In this case, the event name, the event start time, and the event continuous time extracted from each event sequence are called "event pair data". On the other hand, if the first event pair is not included in all (or more than predetermined number of) event sequences, the first event pair is abandoned. In this case, the event combination extraction section 14 creates a second event pair and the above processing is repeated for the second event pair. In this way, whenever the event pair changes, a decision of the event pair included in the event sequence of each shop is repeatedly executed.

In the first embodiment, two events, whose event names are dirrerent, are regarded as different kinds. However, even if two event names are the same, two events whose event start times are different may be regarded as different kinds. Furthermore, in order to avoid generating an enormous number of event pairs, an upper limit of the event pair to be extracted may be set. In this case, when the number of extracted event pairs reaches the upper limit, the above-processing is completed.

As a method to create the event pair, a plurality of methods are considered as follows.

(1) Combinations of all kinds of the event sequence are created by a round robin of all event names.

(2) Combinations of the event sequence are created in order from the most important event name by the user's indication. Otherwise, combinations of the event sequence are created in order from the event sequence whose event name is indicated by the user.

(3) Combinations of the event sequence are created in order from the event sequence which corresponding variable of the time series data is largest. For example, the event name (product) whose sale result is highest is preferentially created as the event pair. In this case, in the client apparatus side, the variable data (sale quantity) is necessary to be added to each event sequence.

(4) Combinations of the event sequence are created in order from the event name included in the largest number of event sequences (For example, a product sold in many shops).

(5) Combination of the event sequence are created in order from the event sequence of the characteristic time series part representing a large change (For example, a large inclination of the vector).

Figure 5:
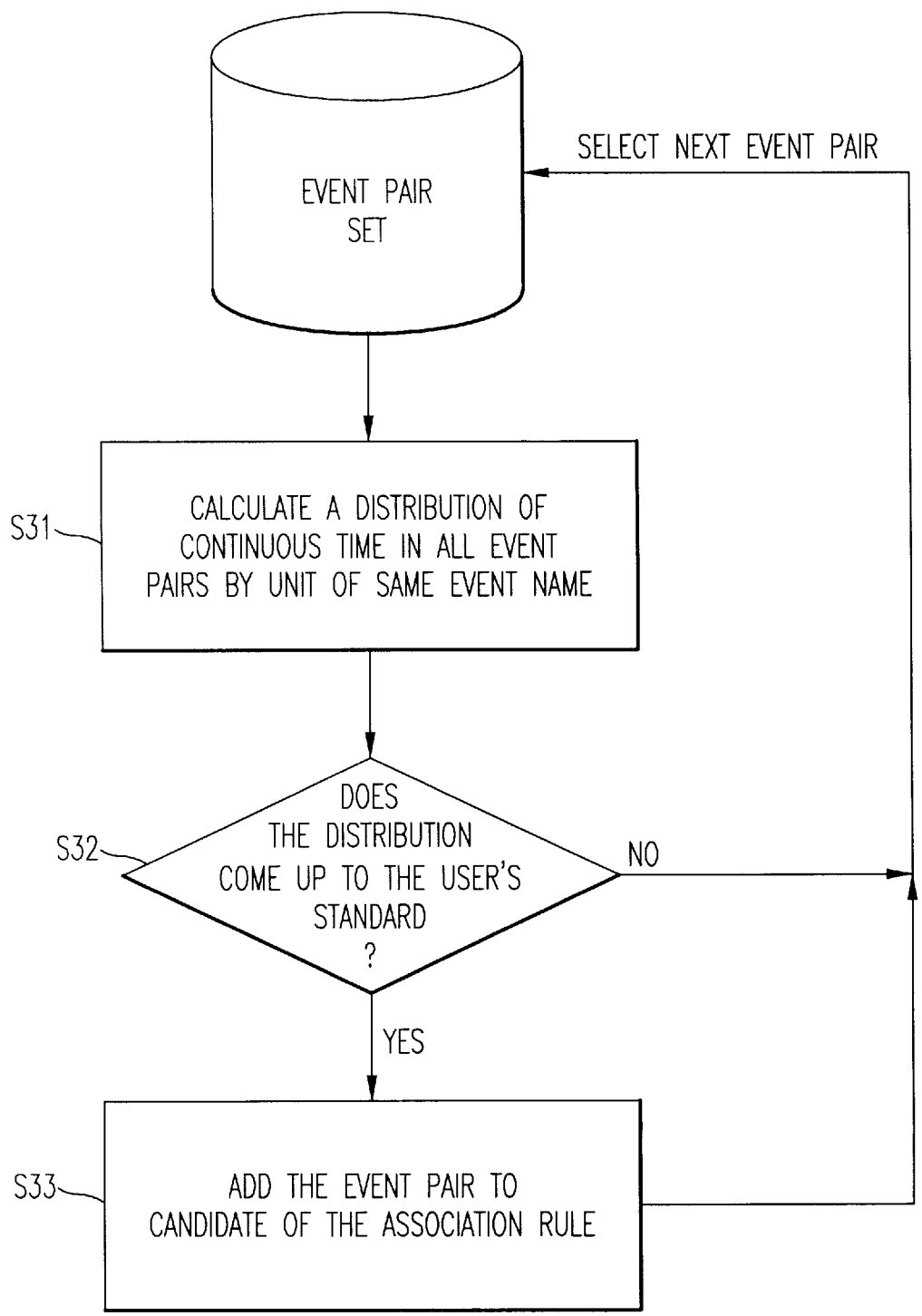
FIG. 5 is a flow chart of processing of an event continuous time decision section of the present invention.

Next, FIG. 5 is a flow chart of processing of the event continuous time decision section 15. After the event combination extraction section 14 extracts a plurality of event pairs by unit of group (shop), the event continuous time decision section 15 calculates a distribution of the continuous time in each event pair for all groups by unit of the same event name (S31). If the distribution of each event name satisfies the user's standard (For example, the distribution is below a threshold) (S32), the event pair including the event name is added to candidates for an association rule (S33). If at least one distribution of the event name does not satisfy the user's standard, the event pair including the event name is abandoned.

Figure 6:
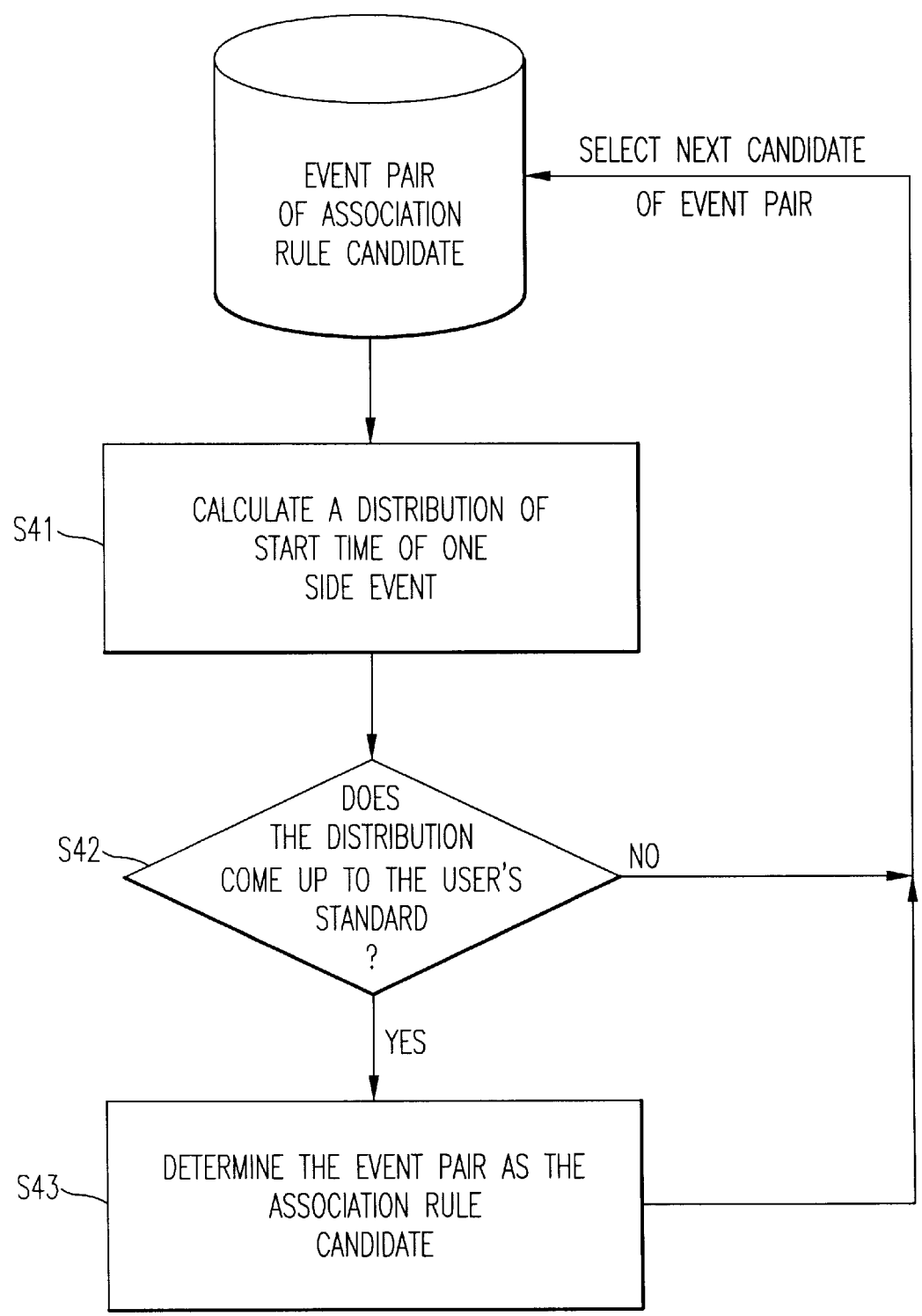
FIG. 6 is a flow chart of processing of an event start time decision section of the present invention.

FIG. 6 is a flow chart of processing of the event start time decision section 16. As for each event pair as the association rule candidate, the event start time decision section 16 calculates a distribution of the start time in each event pair of all groups by unit of same object name (S41). (In this case, the event pair consists of a first event sequence including first event names and a second event sequence including second event names.) If the distribution of the same first event name satisfies the user's standard (For example, the distribution is above a threshold) (S42), the event pair including the first event name is outputted as an association rule candidate (S43). If the distribution of the same first event name does not satisfy the user's standard, a distribution of the start time of other same event name (second same event name) in each event pair of all groups is calculated. If the distribution of the start time of the other same event name satisfies the user's standard, the event pair including the other same event name is outputted as the association rule candidate. If the distribution of the start time of the other same event name does not satisfy the user's standard, the start time of the event name is determined to be related to a predetermined time (For example, Christmas or New Year's Day) and the event pair including the start time is not indicated as an association rule candidate. In this case, the event pair is abandoned. In the above processing, if the distribution of the start time of the same first event name does not satisfy the user's standard, the event pair including the same first event name may be abandoned without decision of the distribution of the start time of the same second event name. Furthermore, the event sequence including the start time related with the predetermined day may be informed to the user.

Figure 7:
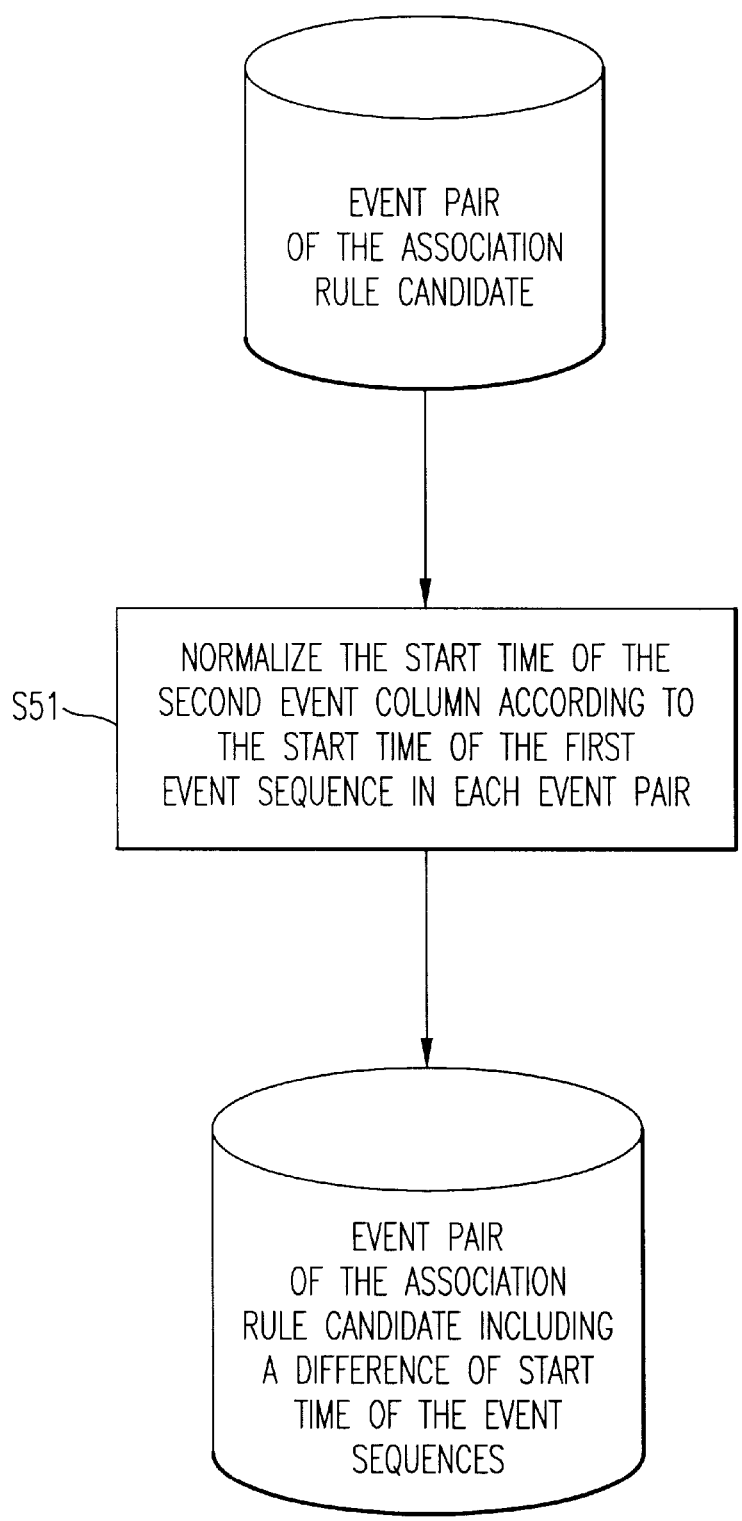
FIG. 7 is a flow chart of processing of an event generation time normalization section of the present invention.

FIG. 7 is a flow chart of processing of the event start time normalization section 17. As for the event pair of the association rule candidate, the event start time normalization section 17 normalizes the start time of the second event sequence according to the start time of the first event sequence in each event pair (S51). In short, based on the start time of the first event sequence in the event pair, the start time of the second event sequence is expressed as a difference (passed time) from the start time of the first event sequence.

Figure 8:
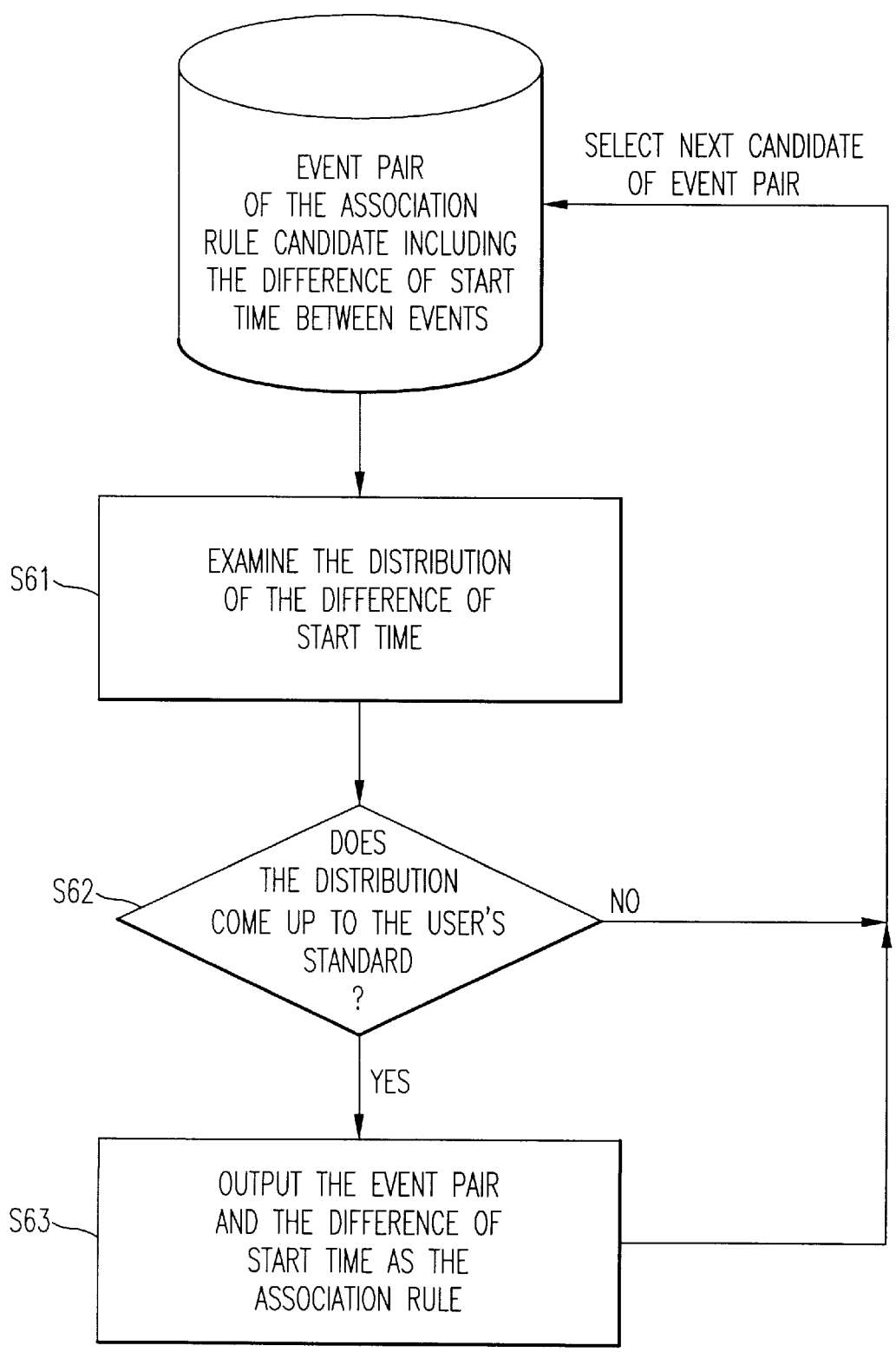
FIG. 8 is a flow chart of processing of an event generation time difference decision section of the present invention.

FIG. 8 is a flow chart of processing of the event start time difference decision section 18. After normalization of the start time of the event sequence in each event pair, the event start time difference decision section 18 calculates a distribution of the normalized difference of the second event sequence of all event pairs (S61). If the distribution of the normalized difference satisfies the user's standard (For example, the distribution is below a threshold) (S62), the event pair including the normalized difference is decided as the event pair of the association rule (S63). In this case, as for each event sequence of the event pair, the event name and an average value (or statistical value) of the normalized difference are outputted. The association rule of the event pair is stored in order in the association rule 19. The data in the association rule 19 is supplied to the client apparatus side. In this way, the event pairs in which the distribution of the normalized difference is small are extracted as combinations of the event sequence including the association rule. For example, assume that two event sequences in the event pair are "event A" and "event B" and the difference of the start time between event A and event B is "n hours", the association rule "The event B generates after n hours from generation of the event A" is found.

As mentioned-above, the event sequence is converted from the characteristic time series part. Therefore, in the server apparatus side or client apparatus side, the event name and the normalized difference can be reconverted to expression of the time series data. For example, by two event names [X__A] [Y__B] and the normalized difference [2(months)] (A:rise of sale, B:descent of sale), the expression "If the sale of product X rises, the sale of product Y descends after two months" is generated. If necessary, the average of the start time, the continuous time of desired event sequence in the event pair of the association rule may be outputted.

Figure 9A:
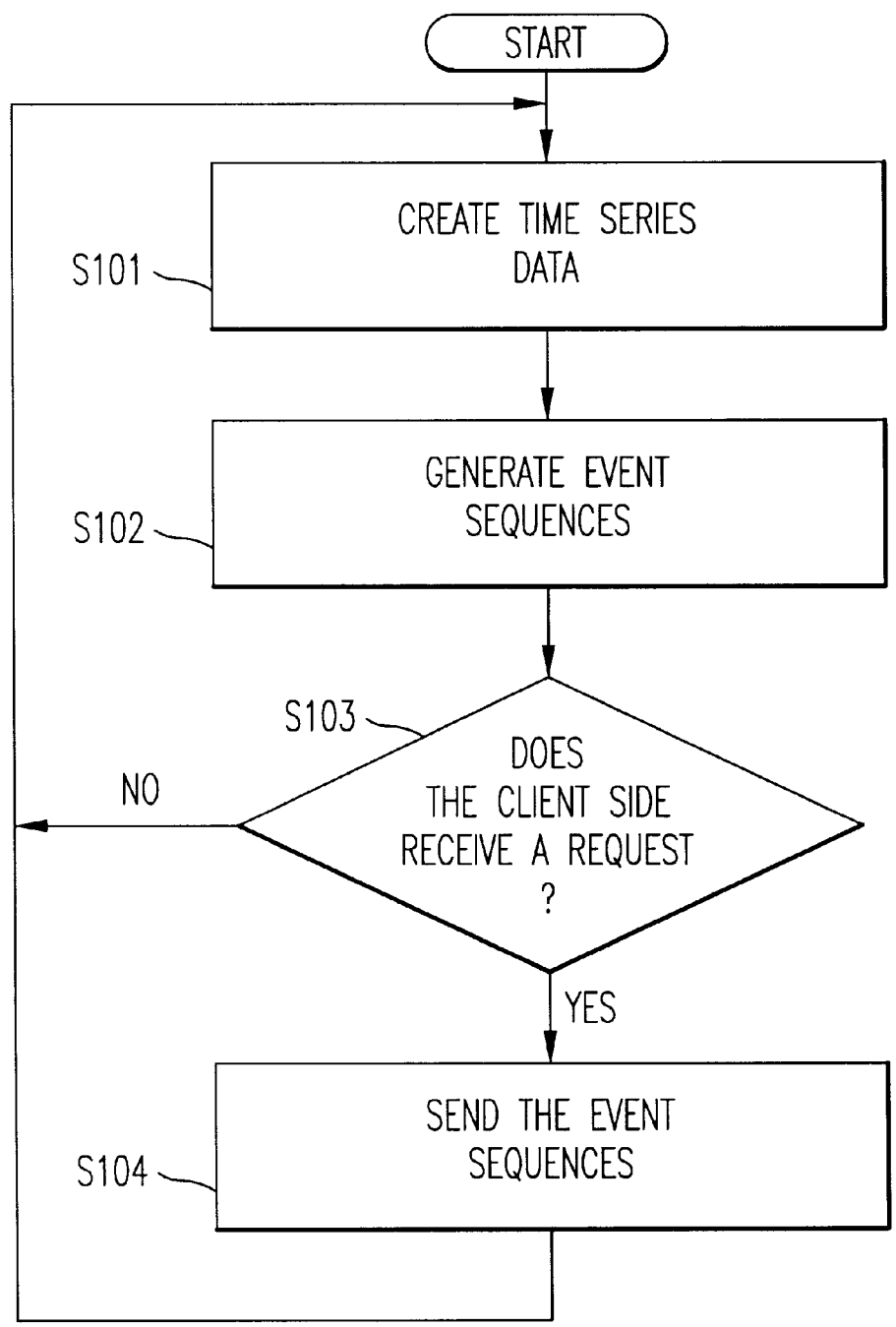
FIGS. 9($a$) and 9($b$) are flow charts of processing of a client side and a server side of the present invention.
Figure 9B:
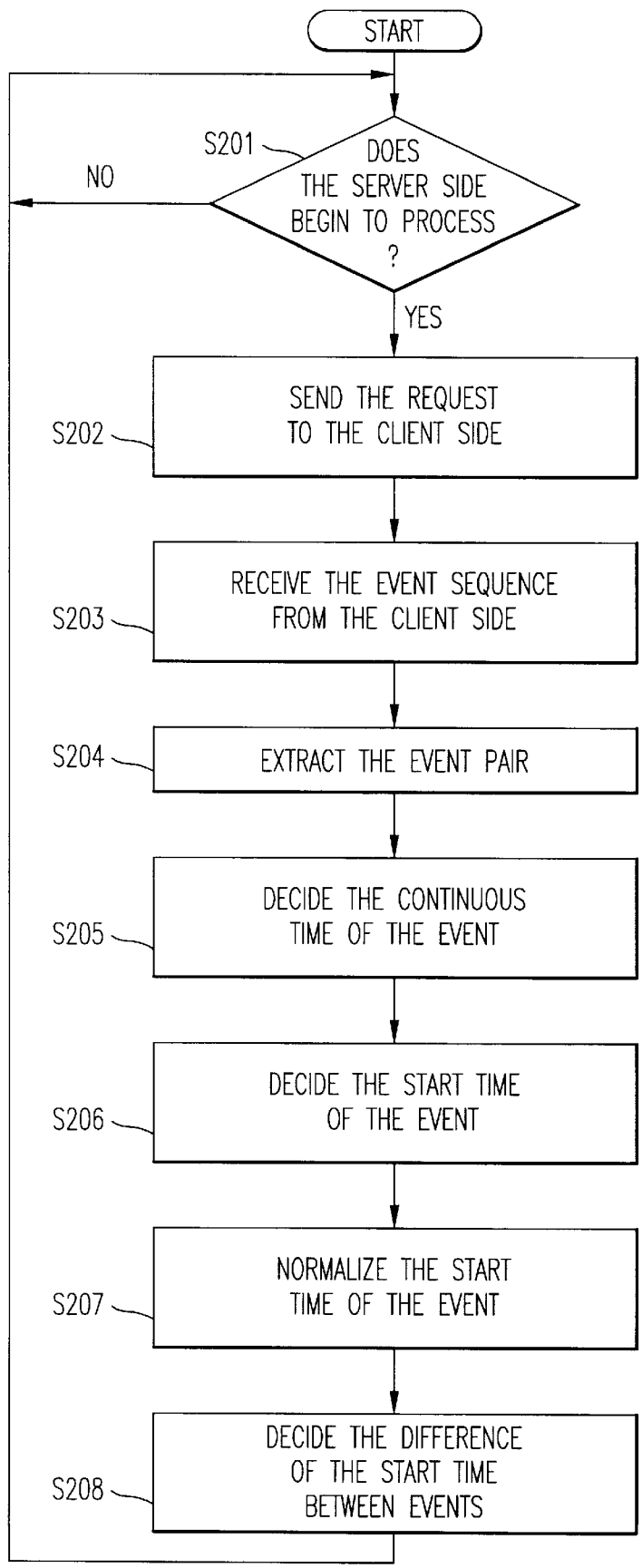

FIGS. 9A and 9B are respectively flow charts of processing of the client apparatus and the server apparatus. Each client apparatus continuously executes creation of the time series data (S101) and generation of the event sequence (102). On the other hand, the server apparatus executes a series of processing in response to indication at predetermined interval or from outside. When the series of processing is begun to execute by the indication (S201), the server apparatus sends a request to transmit the event sequence to each client apparatus (S202). In the request, a limit of period of the event sequence to be transmitted is written. When each client apparatus receives the request (S103), the each client apparatus sends the event sequence corresponding to the request to the server apparatus (S104). When the server apparatus receives the event sequences from each client apparatus (S203), the server apparatus executes a series of processings (S204~S208). The association rule obtained from the event pair is stored in the server apparatus and supplied as tendency analysis. Furthermore, the association rule or the analysis result is feedbacked to each client apparatus after the series of processing or at a suitable timing.

FIGS. 10A, 10B, 10C are respectively the time series data of sale quantity from April to October of product X,Y in shops A,B,C. An example of the first embodiment of the present invention is explained by referring to FIGS. A,B,C.

First, the characteristic time series part extraction section 12 extracts the characteristic time series part from the time series data in FIGS. 10A, 10B, 10C. In this case, the time series data, in which the sale continuously rises over two months and the amount sold is above twice for the two months, is defined as the characteristic time series part. Hereinafter, the time series data in which the amount sold rises more than doubles over two months represents a sudden increase of the amount sold. For example, in each time series data of FIGS. 10A, 10B, 10C, increase and decrease of sale of neighboring months are examined. By calculating sales ratio between the month and the last month, the month before last, the part which the sale continuously rises over two months and the amount sold increasing more than twice for the two months is extracted. In shop A of FIG. 10A, sale of product X suddenly rises from April for two months and sale of product Y suddenly rises from June for two months. In shop B of FIG. 10B, sale of product X suddenly rises from May for two months and sale of product Y suddenly rises from July for two months. In shop C of FIG. 10C, sale of product X suddenly rises from April for two months and sale of product Y suddenly rises from June for two months. In this way, as shown in FIGS. 11A, 11B, 11C, the characteristic time series part is extracted for each shop A, B, C. Then, the characteristic time series part extraction section 12 creates the event sequence 13 from the characteristic time series part. In this case, a format of the event sequence is defined as ["event name", "start time", "continuous time"]. For example, if the characteristic time series part represents "sale of product X suddenly rises from April for two months," the event sequence [X SUDDEN INCREASE, FROM APRIL, FOR TWO MONTHS] is created. As a result, the event sequences of each shop A,B,C are created as shown in FIG. 12. By this conversion processing, sales data for seven months of two products (X,Y) of three shops (A,B,C) (total units of numeric data is forty-two) are reduced to six sign data of two event names (X,Y) in three shops (A,B,C) and twelve sign data representing the start time and the continuous time of two events in three shops (total units of sign data is eighteen).

Next, the event combination extraction section 14 creates an event pair consisting of a first event sequence and a second event sequence by unit of shop. In FIG. 12, two event names "X_SUDDEN INCREASE""Y_SUDDEN INCREASE" are only included as the event sequence of each shop. Therefore, in this case, the event pair consisting of "X_SUDDEN INCREASE""Y_SUDDEN INCREASE" is only created. In normal cases, as mentioned-above, the event pair is created in order by a round robin of all event sequences. Then, if the event pair of combination of same event name is commonly included in the event sequences of each shop, the event name, the event start time and the event continuous time are extracted from each event sequence of each shop. In FIG. 12, the combination of "X_SUDDEN INCREASE""Y_SUDDEN INCREASE" is respectively extracted from the event sequence of shop A,B,C as the event pair. In this example, one table of the event pair is only created as shown in FIG. 13 because the combination of two event sequences is only one kind ("X_SUDDEN INCREASE""Y_SUDDEN INCREASE"). However, a plurality of kinds of the combination of two event sequences are created, a plurality of tables corresponding to the plurality of kinds are created.

Next, the event continuous time decision section 15 calculates a distribution of the continuous time of each event sequence in all event pairs by unit of the same event name. If the distribution satisfies a predetermined distribution standard, the event pair is added to the candidates for an association rule. In FIG. 13, the continuous time of "X_SUDDEN INCREASE" of shops A,B,C is respectively two-months. The continuous time of "Y_SUDDEN INCREASE" of shops A,B,C is respectively two months. Therefore, the distribution of the continuous time of the two event columns respectively satisfies the predetermined standard.

Next, the event start time decision section 16 calculates a distribution of the start time of the same event name of the first event sequence in all event pairs and decides whether the distribution satisfies a predetermined distribution standard. In FIG. 13, the start time of "X_SUDDEN INCREASE" of the first event sequence of shops A,B,C is respectively [APRIL, MAY, APRIL]. In this case, the distribution of the start time is decided to satisfy the predetermined standard and the event pair is correctly decided to be a candidate for an association rule.

Next, the event start time normalization section 17 normalizes the start time of the second event sequence according to the start time of the first event sequence in each event pair. In FIG. 13, the start time of "Y_SUDDEN INCREASE" is normalized by the start time of "X_SUDDEN INCREASE". If the start time of "X_SUDDEN INCREASE" is N, the start time of "Y_SUDDEN INCREASE" is calculated as a difference time (passed time) from N as shown in FIG. 14. The event start time difference decision section 18 calculates a distribution of the normalized difference of all event pairs and decides whether the distribution satisfies a predetermined distribution standard. In FIG. 14, the normalized difference of "Y_SUDDEN INCREASE" of shops A,B,C is respectively (+2) months. Therefore, the normalized difference is decided to satisfy the predetermined standard.

In this way, the association rule "If first event [X_SUDDEN INCREASE] generates, second event [Y_SUDDEN INCREASE] generates after predetermined period" is extracted from the time series data in FIG. 10. The continuous time and the difference of the start time in the association rule can be calculated by predetermined methods, i.e., the average of the continuous time calculated by the event continuous time decision section 15 and so on. Finally, in this example, a rule "If first event [product X_SUDDEN INCREASE] generates, second event [product Y_SUDDEN INCREASE] generates after two months. The continuous time of each event is two months." is found. Furthermore, assume that "X_SUDDEN INCREASE" and "Y_SUDDEN INCREASE" are respectively replaced by "Sales of product X suddenly increase." and "Sales of product Y suddenly increase." In this case, an association rule "If the sales of product X suddenly increase, the sales of product Y suddenly increase after two months and the increase period is two months." is found.

As mentioned-above, in the first embodiment, the characteristic part is extracted from the time series data and converted to the event sequence. Accordingly, the quantity of series data to be analysed is greatly reduced and analysis of the reduced data is easily executed. Furtheremore, the event sequence includes the start time and the continuous time of the event object. Accordingly, the association rule between two event sequences is easily found. The calculation quantity of the first embodiment is in proportion to a length of the time series data in extraction processing of the characteristic part and conversion processing to the event sequence. However, the calculation quantity of post processing is independent of the length of the time series data and only in proportion to combination number of the event sequence because the event sequence is only used. Accordingly, the association rule between the time series data of two event object is easily found in comparison with the statistic method of the prior art. Furthermore, in the first embodiment, by only processing part to extract the association rule from the event sequence, the server apparatus and method to find the association rule from the event sequence including the start time and the continuous time are presented.

Next, the data processing system of the second embodiment of the present invention is explained. The data processing system of the second embodiment is basically the same as the first embodiment. Hereinafter, the different parts only are explained. First, in the client apparatus of the second embodiment, the event sequence actually generated is used instead of the event sequence extracted from the time series data. Therefore, the time series database 11 and the characteristic time series part extration section 12 of the first embodiment are not necessary. In this case, the event sequence actually generated is directly recorded in the event sequence memory section 13. Furthermore, in the second embodiment, the event sequence includes the start time without the continuous time. Therefore, in the server apparatus, processing for the continuous time by the event continuous time decision section 15 is deleted.

Hereinafter, as a concrete example, extraction of the association rule from the event sequence representing various events in shop is explained. FIG. 15 is the event sequence in two shops A,B. This corresponds to the event sequence of the first embodiment. In the shop A as shown in FIG. 15, a special sale advertisement is held in January 10th, a general cleaning is executed in January 11th, a full-house bonus is presented in January 12th. In the shop B, stocktaking is executed in January 21st, the special sale advertisement is held in January 23rd, the full-house bonus is presented in January 25th. In case the event pair is generated by a round robin of the event sequence of each shop, the event pairs shown in FIGS. 16~20 are obtained. The special sale advertisement and the full-house bonus are held in both shops A,B and the event pair consisted of these two event sequences are created in both shops A,B as shown in FIG. 16. However, the general cleaning is held in shop A only and the stocktaking is held in shop B only. Therefore, as shown in FIGS. 17~20, the event pair including the general cleaning or the stocktaking is created in one of the shops A,B. In this embodiment example, an extraction processing of the association rule from the event pair in FIG. 16 is explained. First, the event start time normalization section 17 normalizes the start time of the second event sequence according to the start time of the first event sequence in each event pair of FIG. 16. In this case, if the start time of the special sale advertisement is N, the start time of the full-house bonus is normalized as (N+2) as shown in FIG. 21. Next, the event start time difference decision section 18 calculates a distribution of the normalized difference time of the full-house bonus of shops A,B and decides whether the distribution satisfies the user's standard. In the example of FIG. 21, the normalized difference time (N+2) satisfies the user's standard. As a result, the association rule "If the special sale advertisement is held, a large number of customs is gained after two days as the full-house bonus is presented." is founded.

Next, modification examples of the first, and second embodiments are explained.

(Modification 1)

In the first and second embodiments, the event start time decision section 16 is omitted, and the event continuous time decision section 15 and the event start time normalization section 7 may be combined without decision of the association rule between the start time and the predetermined time. In this case, the event pair to be abandoned by the event start time decision section 16 is sometimes extracted as the rule and presented to the analysis. Furthermore, the event continuous time decision section 15 is omitted, and the event combination extraction section 14 and the event start time decision section 16 may be combined. In this case, even if the continuous times of the event sequences having the same event name are distributed for each client apparatus, the event pairs including these event sequences are not abandoned as non-association rule. Furthermore, the event continuous time decision section 15 and the event start time decision section 16 may be omitted. Arrangement order of the event continuous time decision section 15, the event start time decision section 16, the event start time normalization section 17 and the event start time difference decision section 18 are suitably changed.

(Modification 2)

In the first embodiment, a function to extract the association rule between the event sequence including the continuous time (FIG. 12) and the event sequence not including the continuous time (FIG. 15) may be added. In the client apparatus, first database to store the event sequence including the continuous time extracted by the characteristic time series part extraction section 12 and second database to store the event sequence not including the continuous time, respectively generated from the client apparatus side, are set. Each event sequence is sent to the server apparatus. In the server apparatus side, in addition to extraction of the association rule between the event sequences including the continuous time, the association rule between the event sequence including the continuous time and the event sequence not including the continuous time is extracted. In this case, in the first embodiment, processing of the event continuous time decision section 15 is executed for only the event sequence including the continuous time or omitted. As a result, the association rule "generation of event X not including the continuous time→generation of event A including the continuous time after t1 (continuous time=t2)." is obtained.

Furthermore, in the server apparatus, a database to store predetermined event sequence not including the continuous time, commonly collected from each client apparatus, may be set. In all event sequences collected from each client apparatus, the event sequence associated with the predetermined event sequence may be extracted. In this case, the event combination extraction section 14 creates the event pair consisted of the predetermined event sequence and the event sequence collected from each client apparatus. Processing of the event continuous time decision section 15 is omitted or executed to the event sequence including the continuous time. Processing of the event start time decision section 16 is omitted or executed to the event sequence collected from each client apparatus. As a result, for example, the association rule "If a predetermined team of some sports wins, sales of sports newspaper rises next day." is obtained. Generally speaking, the association rule "generation of a predetermined event X not including the continuous time→generation of event A including the continuous time after t1 (continuous time=t2)" is obtained.

(Modification 3)

In the above-mentioned embodiments and modifications, a rule may be further added by analysing the association rule obtained. For example, assume that following association rules are obtained.

(1) Sale of product A rises. →Sale of product B rises after t1.

(2) Sale of product B rises. →Sale of product C rises after t2.

(3) Sale of product B rises. →Sale of product D rises after t3.

In this case, following new rule may be obtained. (Sale of product A rises. →Sale of product B rises after t1. →(Sale of product C rises after t2 and sale of product D rises after t3.))

(Modification 4)

In the first embodiment and each modification, each client apparatus may include the time series database 11 only. In this case, the characteristic time series part extraction section 12 and the event sequence memory section 13 are set in the server apparatus.

A memory can be used to store instructions for performing the process of the present invention described above, such a memory can be a hard disk, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for analyzing time series data for a plurality of items, the time series data for each item consisting of values of variable arranged by a unit of a predetermined period, comprising:

characteristic part extraction means for extracting a characteristic change part of each item from each of a plurality of the time series data, each for the plurality of items, and for converting the characteristic change part to an event including an event name, a start time and a continuous time representing the characteristic change part, a first event of one item and a second event of another item for each time series data being an event pair; and association rule extraction means for calculating for each event a distribution of the continuous time of each event for the same event name in each event pair, for calculating a distribution of the start time of one event for the same event name in each event pair if the each distribution of the continuous time satisfies a first standard, for calculating a distribution of a difference of the start time between the first event and the second event in each event pair if the distribution of the start time satisfies a second standard, and for determining the same event name and the difference of the start time as an association rule representing a tendency between the first event and the second event if the distribution of the difference of the start time satisfies a third standard.

2. The apparatus according to claim 1, wherein the event name is represented by a combination of a character change sign with a name of the item of the characteristic change part, and wherein the continuous time includes none.

3. The apparatus according to claim 1, wherein said characteristic part extraction means comprises:

means for extracting a maximum point and a minimum point from a graph corresponding to the time series data for each item, means for creating a vector linked between the maximum point and the neighboring minimum point, means for deciding whether an absolute value of inclination and a length of the vector are above each threshold, and means for extracting a start point of the vector as the start time and the length of the vector as the continuous time if the absolute value and the length are above the each threshold.

4. The apparatus according to claim 1, wherein each of the plurality of the time series data each for the plurality of items is prepared by each client side.

5. The apparatus according to claim 1, wherein said association rule extraction means comprises:

means for deciding if the each distribution of the continuous time is below a first threshold as the first standard.

6. The apparatus according to claim 1, wherein said association rule extraction means comprises:

means for deciding if the distribution of the start time is above a second threshold as the second standard.

7. The apparatus according to claim 1, wherein said association rule extraction means includes means for calculating a relative start time of the second event based on the start time of the first event in the each event pair.

8. The apparatus according to claim 1, wherein said association rule extraction means comprises:

means for deciding if the distribution of the relative start time in the each event pair is below a third threshold as the third standard.

9. The apparatus according to claim 6, wherein said association rule extraction means comprises:

means for deciding that the start time of the one event for the same event name relates to a predetermined time if the distribution of the start time is not above the second threshold.

10. A method for analyzing time series data for a plurality of items, the time series data for each item consisting of arranging values of variable by unit of a predetermined period, comprising the steps of:

extracting a characteristic change part of each item from each of a plurality of the time series data each for the plurality of items;

converting the characteristic change part to an event including an event name, a start time and a continuous time representing the characteristic change part, a first event of one item and a second event of another item for each time series data being an event pair;

calculating each distribution of the continuous time of each event for the same event name in each event pair;

calculating a distribution of the start time of one event for the same event name in each event pair if the each distribution of the continuous time satisfies a first standard;

calculating a distribution of a difference of the start time between the first event and the second event in each event pair if the distribution of the start time satisfies a second standard; and determining the same event name and the difference of the start time as an association rule representing a tendency between the first event and the second event if the distribution of the difference of the start time satisfies a third standard.

11. The method according to claim 10, wherein the event name is represented by combining a character change sign with a name of the item of the characteristic change part, and wherein the continuous time includes none.

12. The method according to claim 10, wherein the step of extracting a characteristic change part comprises:

extracting a maximum point and a minimum point from a graph corresponding to the time series data for each item;

creating a vector linked between the maximum point and the neighboring minimum point;

deciding whether an absolute value of inclination and a length of the vector are above each threshold; and extracting a start point of the vector as the start time and the length of the vector as the continuous time if the absolute value and the length are above each threshold.

13. The method according to claim 10, wherein each of the plurality of the time series data each for the plurality of items is prepared by each client side.

14. The method according to claim 10, wherein the step of calculating each distribution of the continuous time comprises:

deciding if the each distribution of the continuous time is below a first threshold as the first standard.

15. The method according to claim 10, wherein the step of calculating a distribution of the start time comprises:

deciding if the distribution of the start time is above a second threshold as the second standard.

16. The method according to claim 10, wherein the step of calculating a distribution of a difference comprises:

calculating a relative start time of the second event based on the start time of the first event in the each event pair.

17. The method according to claim 16, wherein the step of calculating a distribution of a difference comprises:

deciding if the distribution of the relative start time in the each event pair is below a third threshold as the third standard.

18. The method according to claim 15, wherein the step of calculating a distribution of the start time comprises:

deciding that the start time of the one event for the same event name relates to a predetermined time if the distribution of the start time is not above the second threshold.

19. A computer readable memory containing computer readable instructions to analyze time series data for a plurality of items, the time series data for each item consisting of arranging values of variable by unit of a predetermined period, comprising:

instruction means for causing a computer to extract a characteristic change part of each item from each of a plurality of the time series data each for the plurality of items;

instruction means for causing a computer to convert the characteristic change part to an event including an event name, a start time and a continuous time representing the characteristic change part, a first event of one item and a second event of another item for each time series data being an event pair;

instruction means for causing a computer to calculate each distribution of the continuous time of each event for the same event name in each event pair;

instruction means for causing a computer to calculate a distribution of the start time of one event for the same event name in each event pair if the each distribution of the continuous time satisfies a first standard;

instruction means for causing a computer to calculate a distribution of a difference of the start time between the first event and the second event in each event pair if the distribution of the start time satisfies a second standard; and instruction means for causing a computer to determine the same event name and the difference of the start time as an association rule representing a tendency between the first event and the second event if the distribution of the difference of the start time satisfies a third standard.

20. A client apparatus for converting time series data to an event, comprising:

time series data memory for storing the time series data for the plurality of items, the time series data for each item consisting of arranging values of variable by unit of a predetermined period; and characteristic part extraction means for extracting a characteristic change part of each item from the time series data, and for converting the characteristic change part to the event including an event name, a start time and a continuous time representing the characteristic change part, a first event of one item and a second event of another item for the time series data being an event pair.

21. A server apparatus for determining an association rule from a plurality of event pairs, comprising:

event memory for storing the plurality of event pairs, each event pair consisting of a first event of one item and a second event of another item for time series data of a plurality of items, the time series data of each item consisting of arranging values of variable by unit of a predetermined period, each event including an event name, a start time and a continuous time representing a characteristic change part, the characteristic change part of each item being extracted from the time series data of the plurality of items; and association rule extraction means for calculating each distribution of the continuous time of each event for the same event name in each event pair, for calculating a distribution of the start time of one event for the same event name in each event pair if the each distribution of the continuous time satisfies a first standard, for calculating a distribution of a difference of the start time between the first event and the second event in each event pair if the distribution of the start time satisfies a second standard, and for determining the same event name and the difference of the start time as the association rule representing a tendency between the first event and the second event if the distribution of the difference of the start time satisfies a third standard.

22. A client method for converting time series data to an event, comprising the steps of:

storing the time series data of the plurality of items, the time series data of each item consisting of arranging values of variable by unit of a predetermined period;

extracting a characteristic change part of each item from the time series data; and converting the characteristic change part to the event including an event name, a start time and a continuous time representing the characteristic change part, a first event of one item and a second event of another item for the time series data being an event pair.

23. A server method for determining an association rule from a plurality of event pairs, comprising the steps of:

storing the plurality of event pairs, each event pair consisting of a first event of one item and a second event of another item for time series data of a plurality of items, the time series data of each item consisting of arranging values of variable by unit of a predetermined period, each event including an event name, a start time and a continuous time representing a characteristic change part, the characteristic change part of each item being extracted from the time series data of the plurality of items;

calculating each distribution of the continuous time of each event for the same event name in each event pair;

calculating a distribution of the start time of one event for the same event name in each event pair if the each distribution of the continuous time satisfies a first standard;

calculating a distribution of a difference of the start time between the first event and the second event in each event pair if the distribution of the start time satisfies a second standard; and determining the same event name and the difference of the start time as the association rule representing a tendency between the first event and the second event if the distribution of the difference of the start time satisfies a third standard.

24. A computer readable memory containing computer readable instructions to convert time series data to an event, comprising:

instruction means for causing a computer to store the time series data of the plurality of items, the time series data of each item consisting of arranging values of variable by unit of a predetermined period;

instruction means for causing a computer to extract a characteristic change part of each item from the time series data; and instruction means for causing a computer to convert the characteristic change part to the event including an event name, a start time and a continuous time representing the characteristic change part, a first event of one item and a second event of another item for the time series data being an event pair.

25. A computer readable memory containing computer readable instructions to determine an association rule from a plurality of event pairs, comprising:

instruction means for causing a computer to store the plurality of event pairs, each event pair consisting of a first event of one item and a second event of another item for time series data of a plurality of items, the time series data of each item consisting of arranging values of variable by unit of a predetermined period, each event including an event name, a start time and a continuous time representing a characteristic change part, the characteristic change part of each item being extracted from the time series data of the plurality of items;

instruction means for causing a computer to calculate each distribution of the continuous time of each event for the same event name in each event pair;

instruction means for causing a computer to calculate a distribution of the start time of one event for the same event name in each event pair if the each distribution of the continuous time satisfies a first standard;

instruction means for causing a computer to calculate a distribution of a difference of the start time between the first event and the second event in each event pair if the distribution of the start time satisfies a second standard; and instruction means for causing a computer to determine the same event name and the difference of the start time as the association rule representing a tendency between the first event and the second event if the distribution of the difference of the start time satisfies a third standard.

* * * * *